United States Patent
Chen et al.

(10) Patent No.: US 7,483,940 B2
(45) Date of Patent: Jan. 27, 2009

(54) DYNAMIC AGENT WITH EMBEDDED WEB SERVER AND MARK-UP LANGUAGE SUPPORT FOR E-COMMERCE AUTOMATION

(75) Inventors: Qiming Chen, Sunnyvale, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 11/102,999

(22) Filed: Apr. 11, 2005

(65) Prior Publication Data
US 2005/0210456 A1    Sep. 22, 2005

Related U.S. Application Data

(62) Division of application No. 09/804,595, filed on Mar. 12, 2001, now abandoned.

(51) Int. Cl.
G06F 15/16 (2006.01)
(52) U.S. Cl. .................. 709/202; 709/219; 719/317
(58) Field of Classification Search ............... 709/202, 709/203, 208, 219, 220, 223, 224; 719/317
See application file for complete search history.

(56) References Cited

U.S. PATENT DOCUMENTS

| | | | |
|---|---|---|---|
| 6,125,391 A * | 9/2000 | Meltzer et al. | 709/223 |
| 6,163,794 A | 12/2000 | Lange et al. | |
| 6,292,830 B1 | 9/2001 | Taylor et al. | |
| 6,539,416 B1 | 3/2003 | Takewaki et al. | |
| 6,604,135 B1 | 8/2003 | Rogers et al. | |
| 6,631,379 B2 * | 10/2003 | Cox | 707/100 |
| 6,691,151 B1 | 2/2004 | Cheyer et al. | |
| 6,735,632 B1 | 5/2004 | Kiraly et al. | |
| 6,772,109 B2 * | 8/2004 | Tsuchitani et al. | 704/2 |
| 2002/0072998 A1 | 6/2002 | Haines et al. | |
| 2003/0200301 A1 | 10/2003 | Trzcinko et al. | |

OTHER PUBLICATIONS

Qiming Chen et al., "Dynamic-Agents for Dynamic Service Provisioning," published in the Proceeding of 3rd International Conference on Cooperative Information Systems, 10 pages (1998).
Qiming Chen et al., "Dynamic-Agents, Workflow and XML for E-Commerce Automation," Electronic Commerce and Web Technologies, 1st International Conference, EC-Web 2000, 10 pages (Sep. 4-6, 2000).
Qiming Chen et al., "Dynamic Software Agents for Business Intelligence Applications," published in the Proceedings of the 2nd International Conference on Autonomous Agents, 2 pages (1998).
Qiming Chen et al., "Dynamic Agents," published in the International Journal of Cooperative Information Systems, 30 pages (1999).
W3C, "Extensible Markup Language (XML) 1.0," http://www.w3.org/TR/1998/REC-xml-19980210, pp. 1-39 (Feb. 10, 1998).
W3C, "Extensible Markup Language (XML) 1.1 (Second Edition)," http://www.w3.org/TR/2006/REC-xml11-20060816, pp. 1-65 (Aug. 16, 2006).
W3C, "Extensible Markup Language (XML) 1.0 (Fourth Edition)," http://www.w3.org/TR/2006/REC-xml-20060816 pp. 1-62 (Aug. 16, 2006).

* cited by examiner

Primary Examiner—Lashonda T Jacobs (57) ABSTRACT

An agent computer program for use in an automated electronic commerce infrastructure. A client-agent communication mechanism for enabling communication between an agent computer program and at least one client computer process is provided. The client-agent communication mechanism includes a web server embedded in the agent computer program that utilizes a predetermined Internet communication protocol for communication between the agent computer program and the client computer process. An inter-agent communication mechanism is provided for enabling the agent computer program to communicate with other agents. The inter-agent communication mechanism employs documents written in a predetermined markup language for communication.

20 Claims, 7 Drawing Sheets

SELLER_AGENT_PROFILE . HTML

310 ~ CREATOR : ____________

320 ~ DATE OF CREATION : ____________

330 ~ PURPOSE : ____________

340 ~ TASKS: ____________

SELLER_AGENT_STATUS . HTML

PRODUCT_1

410 ~ QUANTITY SOLD ________

420 ~ PRICE SOLD $ ________

430 ~ BUYERS ____, ____, ____, . . . ____

440 ~ CURRENT PRICE $ ________

450 ~ PARTIES CURRENTLY IN NEGOTIATION

PRODUCT_2
:
PRODUCT_N

FIG. 4

SELLER_AGENT_INSTRUCTION HTML

PRODUCT_1

510 ~ LOWEST PRICE  $ _______________

520 ~ PREFERRED PRICE RANGE  $ ___ - $ ___

530 ~ MINIMUM VOLUME PER TRANSACTION ___

⋮

PRODUCT_2

_______________

_______________

_______________

⋮

PRODUCT_N

DYNAMIC AGENT WITH EMBEDDED WEB SERVER AND MARK-UP LANGUAGE SUPPORT FOR E-COMMERCE AUTOMATION

FIELD OF THE INVENTION

The present invention is generally related to dynamic agent computer programs executable on computer systems and the like, and in particular, a dynamic agent computer programs having an embedded web server and mark-up language support for e-commerce automation.

BACKGROUND OF THE INVENTION

To enable an automated electronic commerce infrastructure that employs a plurality of dynamic agents, it is important to have an effective manner in which to communicate information to and from the agents.

There are two primary types of communication. First, there is the communication between the client and its agent (i.e., client-agent communication). An example of client-agent communication is the communication between a seller and the seller's agent. Since the client is often a human user, it is important that this type of communication feature a user-friendly and intuitive interface.

Agents typically operate on different computer systems that have different platforms (e.g., operating systems) and are remote from each other. For example, a seller agent may conduct business (e.g., sell products) on a computer system that is different from the computer system of the seller. Unfortunately, prior art systems require the seller to first log onto the computer system where the agent is operating or executing in order to communicate with its agent. As can be appreciated, it is inefficient to require a client to log onto the computer system where the agent is operating and wasteful of resources.

Moreover, it is also important for the communication mechanism to flexibly provide convenient access for the client to the agent from as many different computer systems, platforms, and devices without encountering difficulty. In other words, it would be highly desirable to have a communication mechanism that provides ready access to the agent from as many different platforms, computer systems, and devices as possible.

Second, there is the communication between agents (i.e., inter-agent communication). An example of inter-agent communication is the communication between a seller agent and a buyer agent. Since the agents may operate in different domains (e.g., entertainment versus banking), it is desirable for the facility for inter-agent communication to effectively communication information between different domains.

In addition, prior art inter-agent communication facilities do not allow for inter-agent communication across different domains. Instead, only agents from a common domain can communicate with each other. As can be appreciated, this approach is restrictive and severely limits the types of agents with which a particular agent can communicate.

Furthermore, the prior art approaches typically require a synchronous connection while communication occurs between agents or between the client and the agent. For example, a client is required to log onto the system where an agent of interest is currently executing and maintain the connection in order to interact with the agent. Unfortunately, in an automated electronic commerce system, where one can imagine tens of thousands of agents conducting business in a virtual marketplace, requiring a synchronous connection negatively impacts one's computing resources and the network through which the agents are connected. Consequently, it is desirable for there to be communication mechanisms that use an asynchronous connection, thereby saving resources. Unfortunately, the prior art communication facilities provided by the prior art electronic commerce systems are not asynchronous in nature.

Based on the foregoing, a significant need remains for an apparatus and method for allowing an agent to communicate information to others effectively, efficiently, and in an asynchronous manner.

SUMMARY OF THE INVENTION

The present invention provides an agent computer program with communication mechanisms for use in an automated electronic commerce infrastructure. A client-agent communication mechanism for enabling communication between an agent computer program and at least one client computer process is provided. The client-agent communication mechanism includes a web server embedded in the agent that utilizes a predetermined Internet communication protocol for communication between the agent computer program and the client computer process. An inter-agent communication mechanism is provided for enabling the agent computer program to communicate with other agents. The inter-agent communication mechanism employs documents written in a predetermined markup language for communication.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

An apparatus and method for providing communication between agent computer programs and between the agent computer program and at least one client computer process are described. In the following description, for the purposes of explanation, numerous specific details are set forth in order to provide a thorough understanding of the present invention.

It will be apparent, however, to one skilled in the art that the present invention may be practiced without these specific details. In other instances, well-known structures and devices are shown in block diagram form in order to avoid unnecessarily obscuring the present invention.

Automated Electronic Commerce Infrastructure 10

Figure 1:
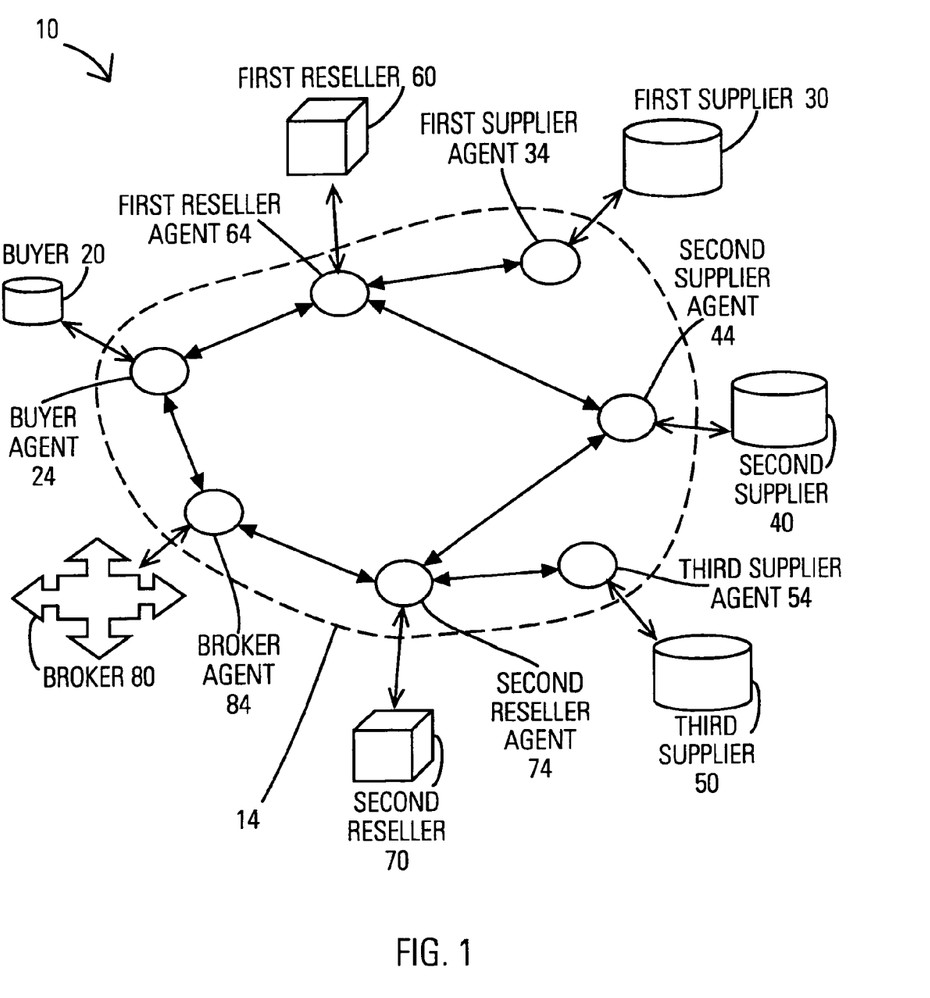
FIG. 1 illustrates an automated electronic commerce infrastructure in which the dynamic agent equipped with the communication mechanisms of the present invention can be implemented.

FIG. 1 illustrates an automated electronic commerce infrastructure 10 in which dynamic agents equipped with communication mechanisms of the present invention can be implemented. The electronic commerce infrastructure 10 includes a plurality of business participants, such as a buyer 20, a first supplier 30, a second supplier 40, a third supplier 50, a first reseller 60, a second reseller 70, and a broker 80. In a non-automated environment, each of the business participants conducts business by having human representatives or agents represent the interests of the business participant.

In an automated environment, a cooperative system 14 that has a plurality of software agents is provided. The agents (e.g., agents 24-84) correspond to each of the business participants. The communication mechanisms of the present invention that may be embodied in each dynamic agent are described in greater detail with reference to FIG. 2. Preferably, the agents are dynamic agents that can, inter alia, carry application programs, be loaded with new functions, dynamically change their behavior, and exchange program objects. Dynamic agents and an electronic commerce infrastructure in which the dynamic agents can be deployed are described in greater detail in a publication entitled, "Dynamic Agents", by Q. Chen, P. Chundi, Umesh Dayal, M. Hsu, International Journal on Cooperative Information Systems, 1999, which is hereby incorporated by reference in its entirety.

Agent Computer Program

Figure 2:
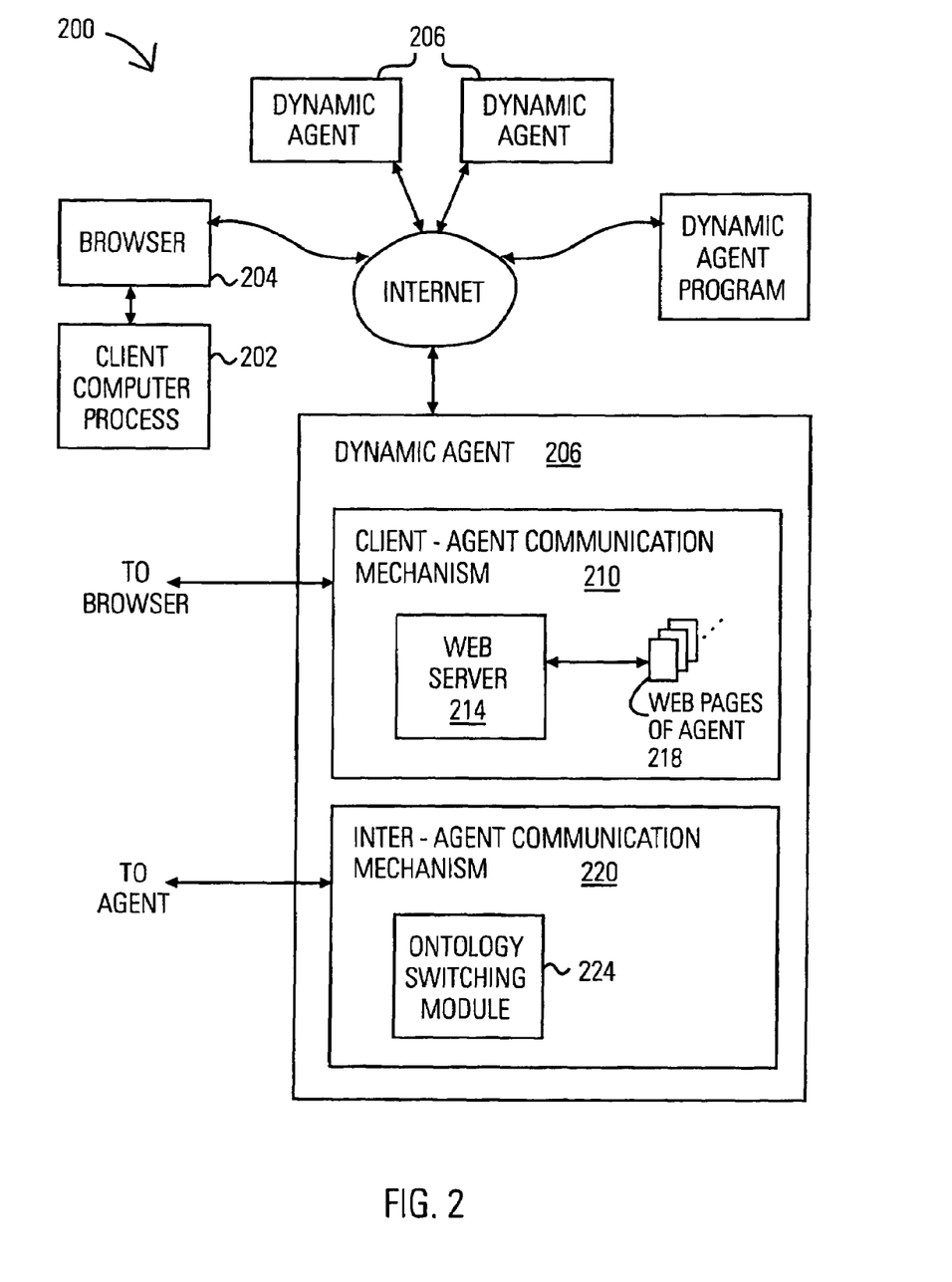
FIG. 2 is a block diagram of a networked computer system environment, illustrating in greater detail the primary components of an agent computer program configured in accordance with one embodiment of the present invention.

FIG. 2 is a block diagram of a networked computer system environment, illustrating in greater detail the primary components of an agent computer program 204 configured in accordance with one embodiment of the present invention and a client computer process 208.

The system 200 includes at least one client computer process 202, a browser 204 accessible to the client process 202, a plurality of dynamic agents 206 interconnected via a network, such as the Internet. Each dynamic agent 206 can have a mechanism 210 for enabling communication between the agent computer program 204 and at least one client computer process 202 and an inter-agent communication mechanism 220 for handling communication between agents 206.

The term, dynamic agent, is a computer program, which has been delegated a degree of autonomy, but which are limited to operating within constraints defined by its client. The client may be, for example, another agent; a computer program, application or system; or an individual interacting with the agent through a computer—hereinafter a client computer process.

The mechanism 210 utilizes a predetermined Internet communication protocol for communication between the agent computer program 204 and the client computer process 208. The client-agent communication mechanism 210 includes a web server 214 for providing the web pages associated to the agent to a client computer process upon request. A web server can be any server process running at a web site that sends out web pages in response to HTTP requests from remote browsers. For example, the web server 214 can be an HTTP server that processes incoming and outgoing data written according to a predetermined Internet communication protocol, such as the HyperText Transport Protocol (HTTP). Preferably, the web server 214 is embedded in the agent. By embedding the web server 214 in the agent and having one or more web pages associated with the agent, the agent program becomes a web object that can be easily accessed by other computer processes without the need of a custom interface. It is further noted that computer processes can interact with the agent computer program without having to maintain a persistent connection with the agent computer program, thereby allowing asynchronous interaction and saving system resources.

The client-agent communication mechanism 210 also includes one or more web pages 218 (e.g., an HTML document) that are associated with the agent. Exemplary web pages for a seller agent are described hereinafter with reference to FIGS. 3-5. The steps performed by the client-agent communication mechanism 210 are described in greater detail hereinafter with reference to FIG. 6.

The agent computer program 204 can also have an inter-agent communication mechanism 220 for enabling the agent 204 to communicate with other agents. The inter-agent communication mechanism 220 employs documents 226 written in a predetermined markup language. The steps performed by the inter-agent communication mechanism 220 are described in greater detail hereinafter with reference to FIG. 7.

It is noted that one advantage of the communication mechanisms of the present invention is that the mechanisms are asynchronous and do not require a ongoing connection between either the client and agent or among agents, thereby saving system resources.

Exemplary Web Pages Associated with a Seller Agent Computer Program

Figure 3:
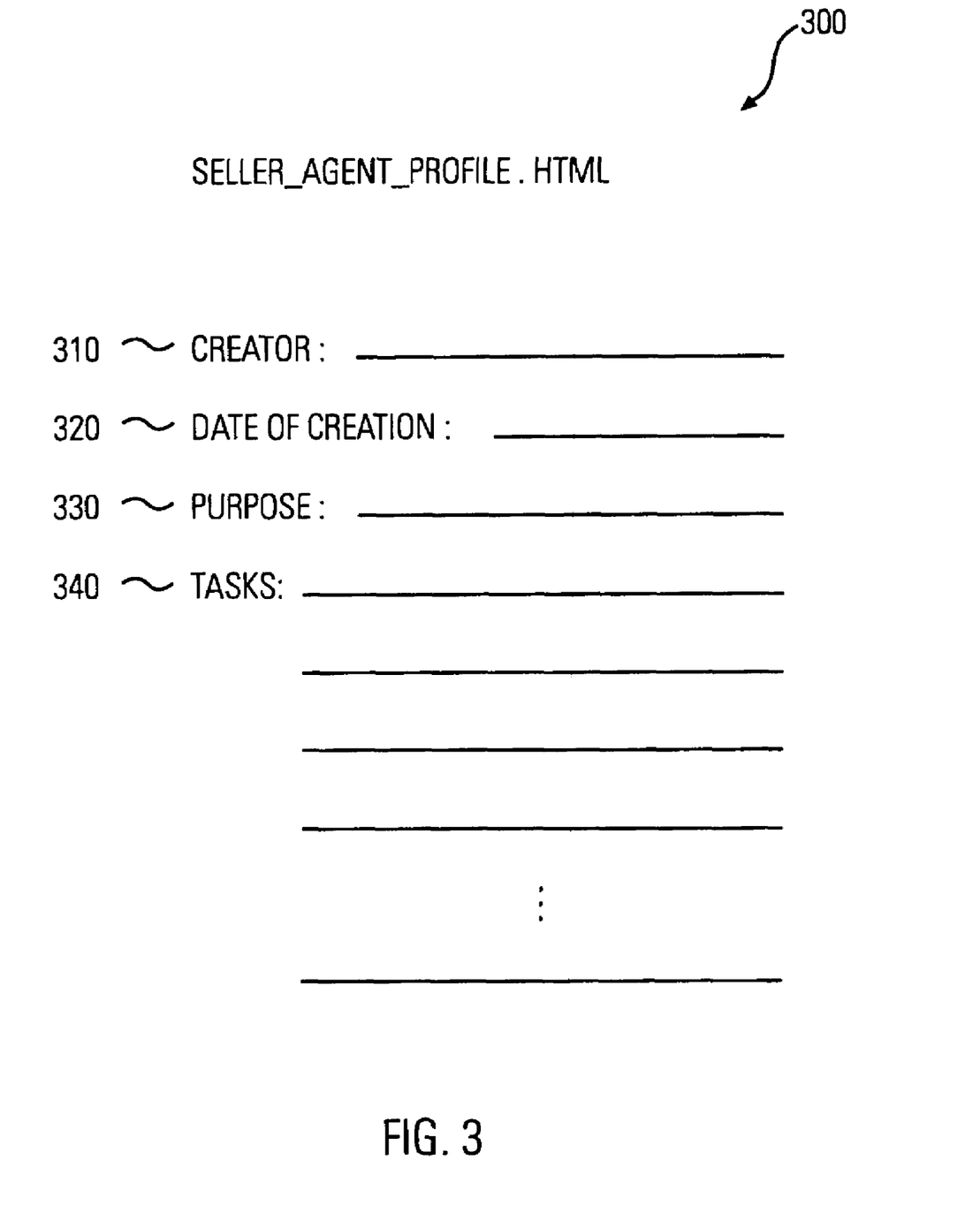
FIG. 3 illustrates an exemplary profile web page associated with a seller agent computer program.

FIG. 3 illustrates an exemplary profile web page 300 associated with agent computer program. This profile web page 300 can be identified by a uniform resource locator (URL) address of "seller_agent_profile.html." The profile web page 300 includes a plurality of fields for providing static information to the client program process. These fields can include, but is not limited to, a creator field 310 for specifying the creator of the agent, a date of creation field 320 for specifying when the agent was created, an agent purpose field 330 for specifying the purpose of the agent, and a tasks field 340 for specifying the various tasks that the agent can perform.

Figure 4:
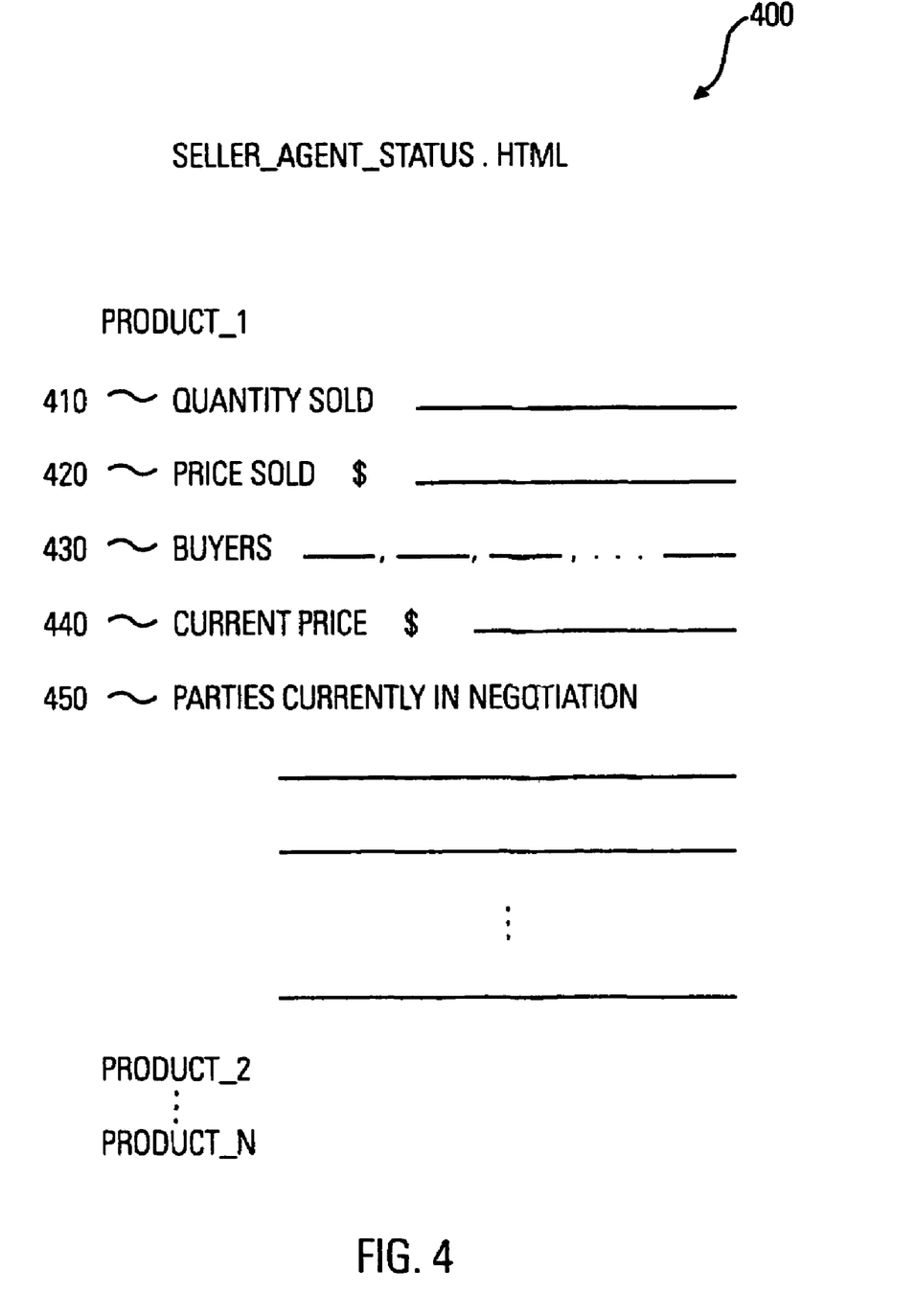
FIG. 4 illustrates an exemplary status web page associated with seller agent computer program.

FIG. 4 illustrates an exemplary status web page associated with agent computer program. This status web page 400 can be identified by a uniform resource locator (URL) address of "seller_agent_status.html." The status web page 400 includes a plurality of fields for providing non-static (e.g., changing values or parameters) information to the client program process. These fields can be organized by products or by another criteria, such as by date and time. These fields can include, but is not limited to, a quantity sold field 410 for specifying the quantity of a first product sold by the agent, a price sold field 420 for specifying the price at which the quantities noted in field 410 were sold, an buyers field 430 for specifying the buyers who have bought from the agent, a current price field 440 for specifying the current price of the product (e.g., the price of the product at the present stage of negotiations), and a tasks field 450 for specifying the parties or buyers that the agent is currently negotiating a sale.

Figure 5:
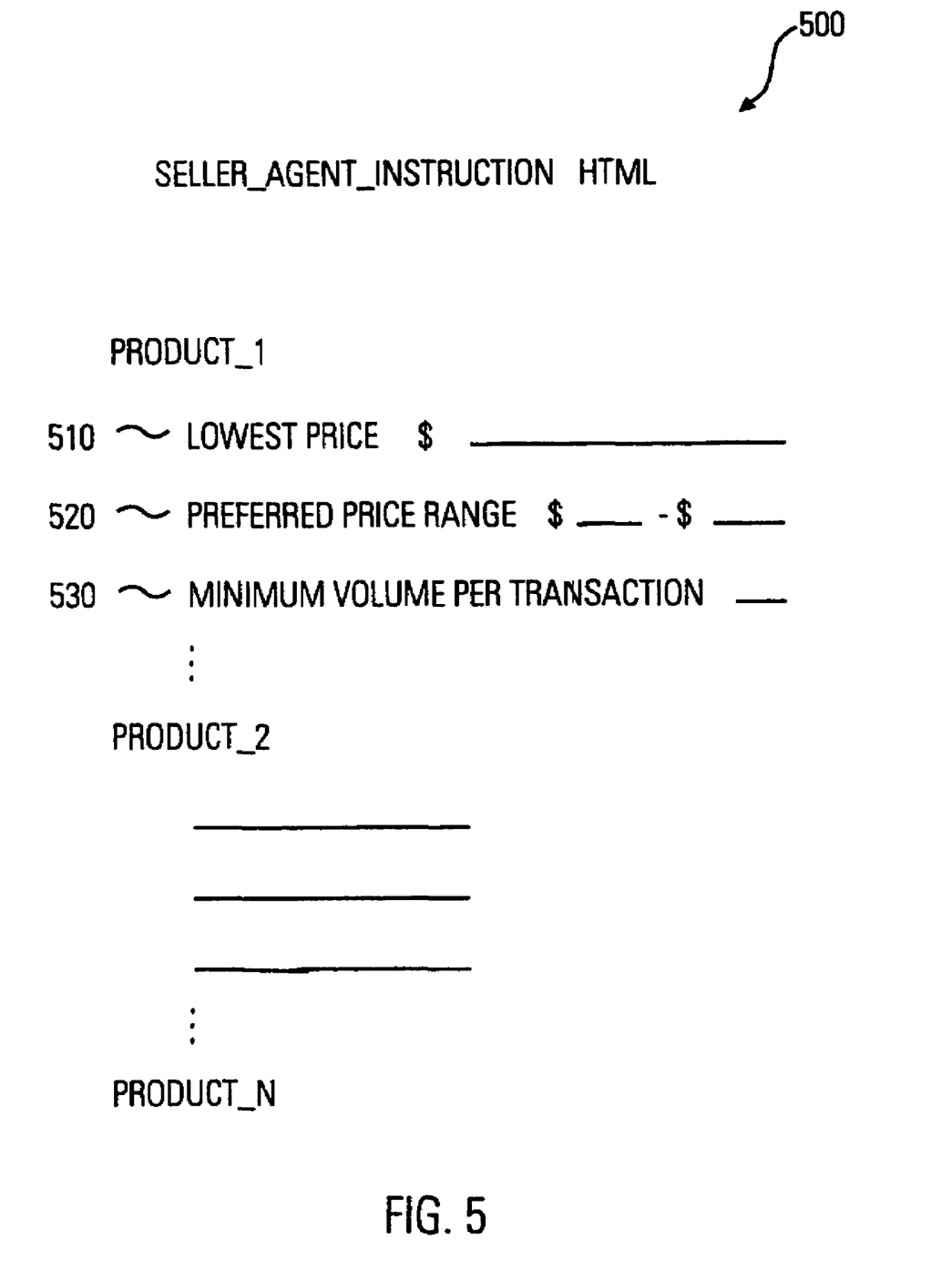
FIG. 5 illustrates an exemplary instruction web page associated with seller agent computer program.

FIG. 5 illustrates an exemplary instruction web page associated with agent computer program. This instruction web page 500 can be identified by a uniform resource locator (URL) address of "seller_agent_instruction.html." The instruction web page 500 includes a plurality of fields for allowing the client program process to provide at least one instruction or command to the agent program. The fields can be organized by products, as shown, or by another criteria, such as by date and time. These fields can include, but is not limited to, a lowest price field 510 for specifying the lowest acceptable price for the product, a price range field 520 for specifying a preferred price range for the product, an volume field 530 for specifying the minimum acceptable volume per transaction.

Client-Agent Communication

Figure 6:
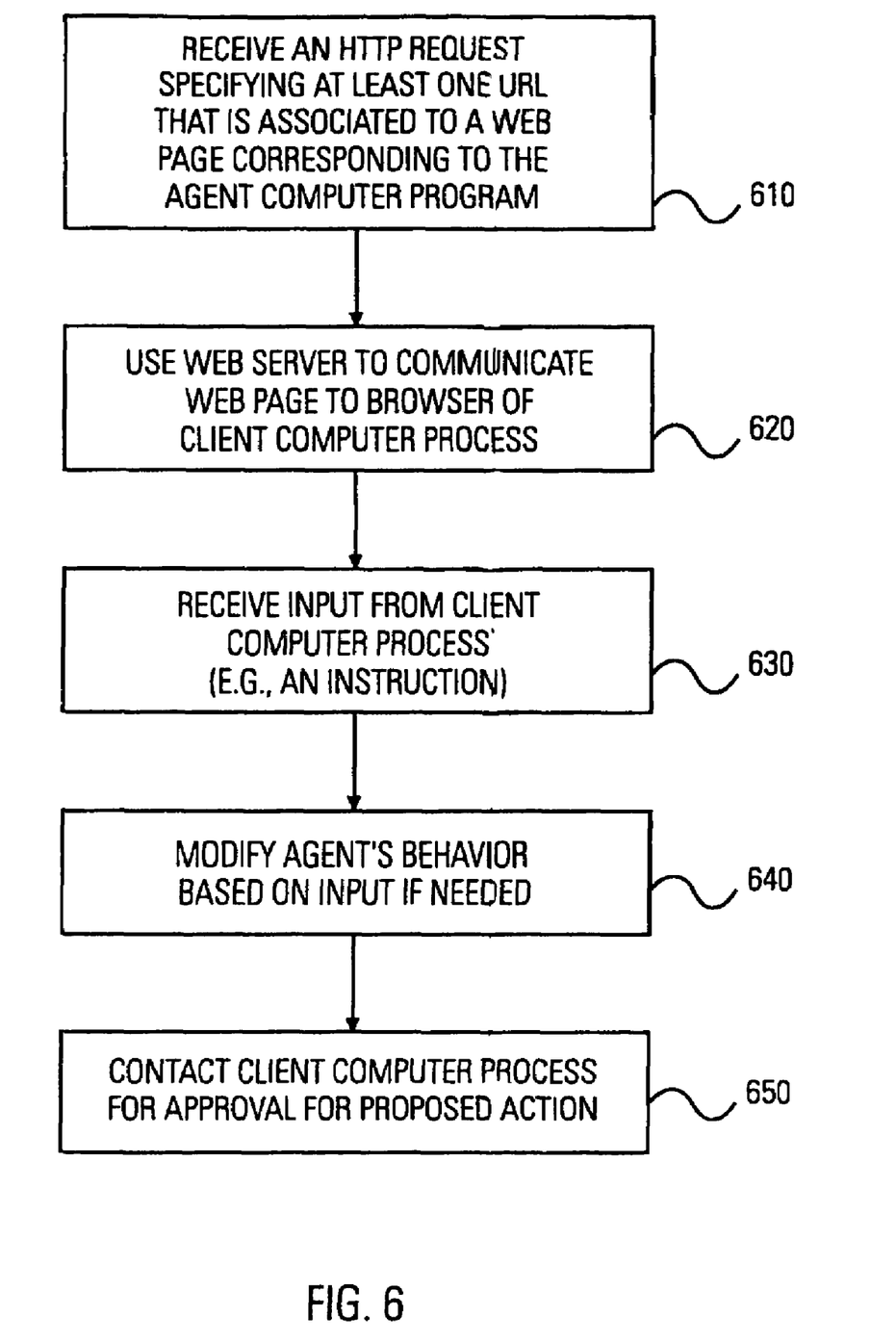
FIG. 6 is a flow chart illustrating the steps performed by the client-agent communication mechanism of FIG. 2 to enable the communication between an agent computer program and a client computer process in accordance with one embodiment of the present invention.

FIG. 6 is a flow chart illustrating communication between an agent computer program and a client computer process performed by the client-agent communication mechanism of FIG. 2 in accordance with one embodiment of the present invention. In step 610, a request (e.g., an HTTP request) is received by the client-agent communication mechanism 210. The request specifies at least one web page that corresponds to the agent by using an address, such as a URL address. In step 620, the dynamic agent then employs a web server (e.g., an embedded HTTP server) to communicate or publish the requested web page to a browser of the client computer process. For example, the current status of the agent can be published to the client computer process via one or more web pages.

In step 630, input (e.g., an instruction) is received from the client computer process. For example, one or more commands can be provided to control the actions of the agent. In step 640, the agents behavior or status is modified based on the input, if needed.

In step 650, the agent can optionally initiate contact with the client computer process by specifying the client's web address. One application where this may occur is approval for a proposed action (e.g., a gray area is reached in the price of the product, and the agent requests client's approval of proposed price).

Agents as Web Objects

The client-agent communication mechanism 210 allows a client to monitor, manage, or interact with the agent remotely. When a dynamic agent is configured with an embedded web server, the agent can deliver a web page to a browser on a remote computer. The web page can then be used by the client to interact with the agent remotely. One advantage of the mechanism 210 is the provision of an easy-to-use, intuitive, and flexible graphical user interface (GUI), which is especially important when the client is a human.

The main difference between treating agents as Web objects and as other Java objects is that each agent has a Web page, which is accessed via a URL. This Web page contains information about the agent itself and about the task it is doing. With this mechanism we can build a virtual market where clients and servers are all connected to the Web, have Web-facing representations, and are able to offer and participate in services on the Web.

As a Web object, an agent connected to the Internet is accessible via HTTP or XML. This typically requires that the agent embeds, or accesses, a web server. An agent is provided with at least one web page (HTML or XML page) that provides an interface for it to be accessed via any browser. The agent "publishes" on that page, a set of control, maintenance and application operations that can be accessed or invoked by using a Web browser.

For example, an agent carrying seller functionality has a web page that shows what it sold, for which price, to whom, and when. The control operations can be represented on the Web page. An authorized person can adjust the price range via the Web page.

As with the agents' names, the URLs of the dynamic agents are preferably maintained by a coordinator that has a stable URL (i.e., having a stable host and port) In the event that the agents move, the coordinator can be consulted to determine the URL of a particular agent.

In one embodiment, operation requests issued from a Web browser to a dynamic agent looks the same as a traditional form request. For example, operation requests may be sent over HTTP using the GET or POST method. In the case of a POST request, the operation name and argument data can be sent in the body of the request. Preferably, the arguments in the URL (including the operation name and return value) are URL-encoded, which is a simple text encoding scheme. However, it is noted that more complex encoding schemes can be used to support integration with non-Web based systems or for the passing of private information types.

It is noted that inter-agent communication using messages does not require the involvement of a web server. For example, the inter-agent communication facility can be an electronic mail facility that supports messages in the form of electronic mail. In this manner, electronic mail attachments, such as text, voice, video data, may also be communicated.

Inter-Agent Communication

Figure 7:
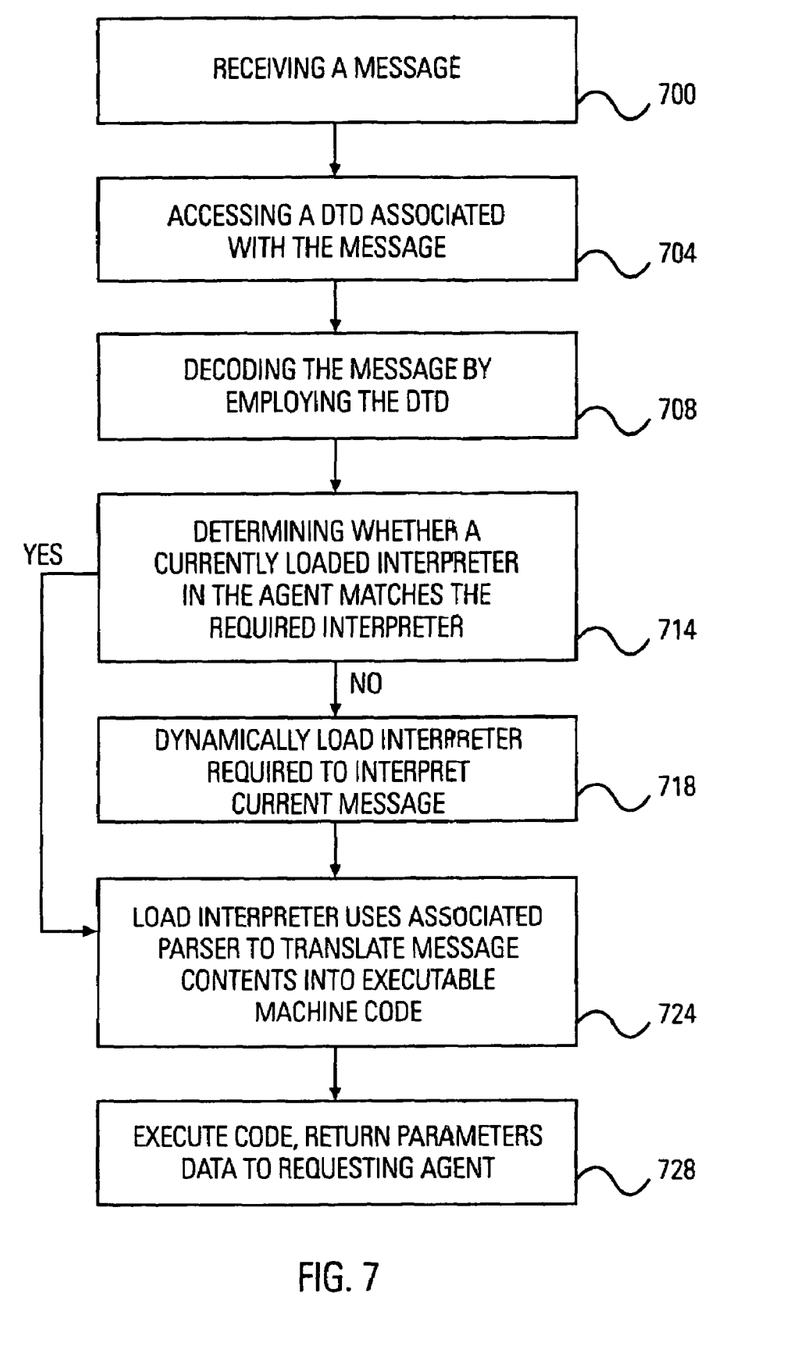
FIG. 7 is a flow chart illustrating the steps performed by the inter-agent communication mechanism of FIG. 2 to enable the communication between agents in accordance with one embodiment of the present invention.

FIG. 7 is a flow chart illustrating inter-agent communication performed by the inter-agent communication mechanism of FIG. 2 in accordance with one embodiment of the present invention. In step 700, a message (e.g., an XML document) is received from another agent. In step 704, a DTD of the message is accessed. For example, the DTD can be received with the message or could have been received previously. As described previously, the DTD is a template with which the message can be decoded correctly. In step 708, the message is decoded by using the DTD. In this step, the interpreter needed to interpret the current message is determined.

In step 714, a determination is made whether the interpreter currently loaded in the agent matches the interpreter needed to interpret the message. If yes, processing proceeds to step 724. Otherwise, in step 718, an appropriate interpreter that is specified in the message, is dynamically loaded into the agent. In step 724, the loaded interpreter uses an associated parser to translate the contents of the message into executable machine code (e.g., a tree of Java objects). The Java objects are executable machine code that performs the program operations and functions. In step 728, the code is executed, and the requested action is performed and any requested information is sent to the requesting agent via a return message.

A message can include the following: 1) envelope information (e.g., name of sender, name of recipient, etc., 2) required interpreter or ontology; 3) and the contents of the message (e.g., data etc.).

Multi-agent Cooperation with XML Messaging

Autonomous agents cooperate by sending messages and using concepts from domain ontology. The inter-agent communication mechanism 220 of the present invention provides a message format with meaningful structure and semantics. The ontology switching module 224 provides a mechanism for agents to exchange ontologies and message interpreters.

Document-Driven Agent Cooperation

The messages can be in the form of a document that is written in a markup language. Preferably, the document is created by using an extensible markup language (XML) which is standard for data interchange on the Web. It is nohd that other message formats are acceptable provided that the selected message format is accepted by the research community and the industry and likely to be adopted by information providers.

In fact, an XML document is an information container for reusable and customizable components, which can be used by any receiving agent. This is the foundation for document-driven agent cooperation. By making the Web accessible to agents with XML, the present invention eliminates the need for custom interfaces for each consumer and supplier. Agents may use an XML format to explain their behavior, functions, interfaces, etc. by defining new performatives in terms of existing, mutually understood ones. Based on the commonly agreed tags, agents may use different style document type descriptions (DTDs) to accommodate the taste of the business units they mediate. Further, a dynamic agent can carry an XML front-end to a database for data exchange, where both queries and answers are XML encoded.

Although XML is well structured for encoding semantically meaningful information, it must be based on the ontology. As ontology varies from domain to domain, and may even be dynamic for dynamically formed domains. A significant issue is how to exchange the semantics of domain models, and how to interpret messages differently in different problem domains. The ontology switching module 224 of the present invention is provided to address this issue and is discussed in greater detail hereinafter.

Generally, a domain ontology provides a set of concepts, or meta-data, that can be queried, advertised and used to control the behavior of cooperating agents. These concepts can be marked using XML tags, and then a set of commonly agreed tags, underlie message interpretation. The structures and the semantics of the documents used in a particular problem domain are represented by the corresponding DTDs and interpreters.

Preferably, different languages, all in XML format, are utilized for different problem domains, such as product ordering, market analysis, etc. Consequently, an individual interpreter for each language is also used. Dynamic agents that include the communication mechanisms of the present invention can exchange the DTDs together with documents, and exchange the corresponding interpreters as programming objects, in order to understand each other.

DTD Based Program Generation

Since information sources are evolving, it is unlikely that we can use fixed programs for information accessing and processing. Our solution is to let a dynamic agent carry program tools that generate XML oriented data access and processing programs based on document type descriptions (DTDs). A DTD (like a schema) provides a grammar that tells which data structures can occur, and in what sequence. Such schematic information is used to automatically generate programs for basic data access and processing (i.e., to create classes that recognize and process different data elements according to the specification of those elements).

For example, from an XML document including tag UNIT_PRICE, a Java method "getUnitPrice" can be generated, provided that the meanings of tags are understood, and an XML parser is appended to the JDK classpath. In one embodiment, the XML parser that is employed is a parser developed by Sun Microsystems that supports SAX (Simple API for XML) and conforms to W3C DOM (Document Object Model).

One advantage of automatic program generation from DTDs is that tasks can be created on the fly, thereby handling the possible change of document structures. For example, when a vendor publishes a new DTD for its product data sheet, based on that DTD, an agent can generate the appropriate programs for handling the corresponding XML documents. Agents use different programs to handle data provided by different vendors.

Ontology Model Switching

Different application domains have different ontology models with different agent communication languages and language interpreters although they are in XML format. In a particular application domain, agents communicate using domain specific XML language constructs and interpreters.

The inter-agent communication mechanism 220 of the present invention enables a dynamic agent to participate in multiple applications. For example, the dynamic agent communicates with other agents for the business of one domain ($D_a$) by employing $D_a$'s language and language interpreter. Similarly, for the business of another domain ($D_b$) by employing $D_b$'s language and language interpreter. A dynamic agent can carry multiple interpreters and adapts to different application domains and ontologies by employing the ontology switching module 224 to detect the particular domain and automatically switch the DTD's and interpreters, thereby enabling communication with agents in that domain.

For example, the following message can be sent to load an interpreter (e.g., a xml_shopping interpreter) to an agent:

```
<MESSAGE type="LOAD" from="A" to="B"
   interpreter="xml.default">
      <CONTENT> <LOAD_INTERPRETER
      class="da.XMLshoppingInterpreter"
   url="file:host.hp.com/Dmclasses">
      xml_shopping
         </LOAD_INTERPRETER> </CONTENT>
   </MESSAGE>
```

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method executed by a computer of communicating between at least two dynamic agent computer programs comprising the steps of:
   a) receiving a message according to an XML format;
   b) accessing a document type description (DTD) of the message and decoding the message by using the DTD, wherein the message further includes XML tags to mark metadata associated with a domain from among a plurality of different domains;
   c) determining an interpreter associated with the message based on the DTD;
   d) determining whether the currently loaded interpreter in the agent computer program matches the interpreter required for the message;
   e) if no, dynamically loading the interpreter needed to interpret the message; and
   f) the loaded interpreter using an associated parser to translate the contents of the message that is according to the XML format, into executable machine code.

2. The method of claim 1 wherein the executable machine code comprises a tree of Java objects that perform the program operations and functions.

3. The method of claim 1 wherein the executable machine code performs the requested action and sends any requested information to the requesting agent via a return message.

4. The method of claim 1 wherein the method is utilized by dynamic agent computer programs in an automated electronic commerce infrastructure.

5. A method implemented on a dynamically configurable agent executed in a computer comprising:
   accessing a document type description (DTD) of a received message and decoding the message using the DTD, wherein the message is according to an XML format and includes XML tags to mark metadata associated with a domain from among a plurality of different domains;

determining whether a current interpreter in an agent computer program matches an interpreter required for the received message;

if the current interpreter does not match the required interpreter, loading the required interpreter to interpret the received message; and the loaded interpreter using an associated parser to automatically generate, from the message according to the XML format, an executable program to run on said dynamically configurable agent.

6. The method of claim 5 wherein the DTD specifies data structures that can occur in the message and an order of the data structures.

7. A dynamic agent executed by a computer, comprising:

an ontology switching module that causes document type descriptions (DTDs) and corresponding interpreters to be exchanged with another agent to implement different communication languages between the agents for different problem domains;

wherein each DTD comprises a template by which a message transmitted between agents can be decoded, wherein the message is according to an XML format and includes XML tags for marking metadata associated with a domain from among a plurality of different domains.

8. The dynamic agent of claim 7 wherein each message includes an interpreter required to interpret the message.

9. The dynamic agent of claim 8 wherein said dynamic agent automatically loads a different interpreter from an interpreter currently loaded in order to process a received message.

10. The dynamic agent of claim 7 wherein the loaded interpreter uses an associated parser to translate contents of the message according to the XML format into machine executable code.

11. The dynamic agent of claim 10 wherein the dynamic agent executes said executable code.

12. A system, comprising:

a plurality of agents executed in respective computers, each agent exchanging messages with at least one other agent according to a dynamically selectable agent communication language;

wherein each agent is to receive a message according to an XML format from another agent that causes the receiving agent to change its agent communication language in order to successfully decode and interpret said message, wherein each agent carries plural interpreters to interpret messages according to different languages, wherein the messages are according to the XML format to describe functions and interfaces of the agents.

13. The system of claim 12 wherein the receiving agent generates machine executable code based on a dynamically selectable agent communication language and a message received from other agent.

14. The system of claim 12 wherein each agent communicates with other agents for the business of one domain by employing the agent communication language and interpreter of that domain, and communicates with still other agents for the business of another domain by employing the agent communication language and interpreter of such other domain.

15. The method of claim 1, wherein the received message is a document, the method further comprising using different interpreters for documents of different languages.

16. The method of claim 5, wherein generating the executable program comprises generating the executable program from content of the received message.

17. The method of claim 5, wherein the received message is a document, the method further using different interpreters for documents of different languages.

18. The method of claim 1, wherein different XML tags are used to mark metadata for the different domains.

19. The method of claim 5, wherein different XML tags are used to mark metadata for the different domains.

20. The dynamic agent of claim 7, wherein different XML tags are used to mark metadata for the different domains.

* * * * *

UNITED STATES PATENT AND TRADEMARK OFFICE
CERTIFICATE OF CORRECTION

PATENT NO. : 7,483,940 B2
APPLICATION NO. : 11/102999
DATED : January 27, 2009
INVENTOR(S) : Qiming Chen et al.

It is certified that error appears in the above-identified patent and that said Letters Patent is hereby corrected as shown below:

In column 6, line 56, before "standard" insert -- a --.

In column 6, line 56, delete "nohd" and insert -- noted --, therefor.

In column 8, line 64, in Claim 5, after "computer" insert -- , --.

Signed and Sealed this

Thirtieth Day of March, 2010

David J. Kappos
*Director of the United States Patent and Trademark Office*